United States Patent
Morgan et al.

(10) Patent No.: US 6,464,457 B1
(45) Date of Patent: Oct. 15, 2002

(54) TURBINE LEAF SEAL MOUNTING WITH HEADLESS PINS

(75) Inventors: Clive A. Morgan, Cincinnati, OH (US); Todd S. Heffron, Indian Springs, OH (US); Eric J. Wienholts, Wyoming, OH (US); Robert I. Ackerman, West Chester, OH (US); John P. Heyward, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/886,820

(22) Filed: Jun. 21, 2001

(51) Int. Cl.[7] ............................. F01D 11/00; F01D 11/08
(52) U.S. Cl. ................... 415/174.2; 415/135; 415/139; 277/630; 277/637; 277/644
(58) Field of Search .................................. 415/135, 138, 415/139, 173.1, 173.3, 174.2, 189, 190, 209.2, 209.3, 209.4; 277/630, 631, 632, 637, 641, 644

(56) References Cited

U.S. PATENT DOCUMENTS

| | | | |
|---|---|---|---|
| 4,126,405 A | | 11/1978 | Bobo et al. |
| 4,767,260 A | * | 8/1988 | Clevenger et al. .......... 415/139 |
| 4,815,933 A | | 3/1989 | Hansel et al. |
| 5,118,120 A | | 6/1992 | Drerup et al. |
| 5,143,292 A | | 9/1992 | Corsmeier et al. |
| 5,797,723 A | | 8/1998 | Frost et al. |
| 6,095,750 A | | 8/2000 | Ross et al. |
| 6,164,656 A | | 12/2000 | Frost |
| 6,402,466 B1 | * | 6/2002 | Burdgick et al. ......... 415/173.3 |

OTHER PUBLICATIONS

General Electric Company, "CFM56–5C HPT Improved AFT Outer Band Sealing", two drawing figure excerpts, in production service more than one year.

* cited by examiner

*Primary Examiner*—Christopher Verdier
(74) *Attorney, Agent, or Firm*—Steven J. Rosen; Rodney M. Young

(57) ABSTRACT

A gas turbine engine arcuate segment has an arcuate band segment, at least one tab and an arcuate rail segment spaced axially apart from the tab and located along an axial end of the band segment. The tab and the arcuate rail segment extend radially away from the band segment and a space is located between the tab and the rail segment. A tab aperture extends entirely through the tab. The rail segment has a rail aperture entirely therethrough. A leaf seal and a spring are disposed within the space to bias the leaf seal against the aft rail. In an exemplary embodiment, a spring aperture extends entirely through the spring, a seal aperture extends entirely through the leaf seal, and a headless pin is disposed in the apertures such that the leaf seal and the spring are radially restrained by the pin.

35 Claims, 5 Drawing Sheets

TURBINE LEAF SEAL MOUNTING WITH HEADLESS PINS

BACKGROUND OF THE INVENTION

1. Field of the Invention

The present invention relates generally to gas turbine engine turbine flowpath seals and, more specifically, to attachment means for arcuate leaf seals therein.

2. Description of Related Art

A gas turbine engine includes a compressor for compressing air which is mixed with fuel and ignited in a combustor for generating hot combustion gases which flow downstream therefrom. The combustion gases flow through one or more turbine stages for extracting energy therefrom for powering the compressor and providing other useful work. A turbine stage includes a stationary turbine nozzle having a plurality of circumferentially spaced apart vanes extending radially between outer and inner bands which define a flowpath for channeling the combustion gases therethrough. Disposed downstream of the turbine nozzle is a turbine stage including a plurality of circumferentially spaced apart rotor blades extending radially outwardly from a rotor disk, and surrounded by an annular shroud which defines a portion of the radially outer flowpath for the combustion gases. The turbine nozzles and rotor shrouds are separately manufactured and assembled into position in the engine. Accordingly, gaps are necessarily provided therebetween for both assembly purposes as well as for accommodating differential thermal expansion and contraction during operation of the engine.

The gaps between these stationary stator components are suitably sealed for preventing leakage therethrough. In a typical high pressure turbine nozzle, a portion of the compressor air is bled therefrom and channeled through the nozzle vanes for cooling thereof. The use of bleed air reduces the overall efficiency of the engine and, therefore, is minimized whenever possible. The bleed air is at a relatively high pressure greater than the pressure of the combustion gases flowing through the turbine nozzle and, therefore, would leak into the exhaust flowpath without providing suitable seals between the stator components.

A particularly useful seal used to seal these gaps in the turbine flowpaths is a leaf seal. The leaf seals typically used in such applications are arcuate and disposed end to end around the circumference of the stator components which are segmented. For example, the radially outer band of the turbine nozzle includes axially spaced apart forward and aft rails. These rails extend radially outwardly, with the aft rail abutting a complementary surface on the adjoining shroud or shroud hanger for providing a primary friction seal therewith. The leaf seal provides a secondary seal at this junction and bridges a portion of the aft rail and the shroud hanger for example.

In order to assemble and mount the leaf seals to the aft rail, each leaf seal typically includes mounting holes at opposite circumferential ends thereof through which are mounted corresponding mounting pins. Corresponding springs such as leaf springs are also used at respective ones of the mounting pins for pre-loading the loosely supported leaf seals against the aft rail and the shroud hanger. During operation when air pressure is developed outboard of the outer band, the air pressure provides a substantial loading force against the leaf seal for improving its sealing effectiveness with the aft rail and the shroud hanger.

In order to support the leaf seals, leaf springs, and mounting pins, the outer band typically includes a plurality of circumferentially spaced apart, radially extending tabs spaced axially from the aft rail. A recess is formed between the tabs and the aft rail in which the leaf seal and leaf spring is disposed. The tabs include forward holes aligned with corresponding aft holes which extend into but not all the way though the aft rail. The mounting pins are inserted through holes in the tabs, leaf spring, leaf seal, and into the aft rail and then fixedly joined thereto by tack welding heads of the mounting pins to the corresponding tabs. In this way, the mounting pins are supported from both ends to the tabs and aft rail, and the leaf seals and leaf springs are trapped in the recess defined between the tabs and the aft rail. To accommodate relative movement between the nozzles and mating hardware, the leaf seals are designed to float about the mounting pins that are firmly attached to the nozzle segment. During engine operation, pressure differential between the cooling supply air and the flowpath air holds the seal against the mating hardware. Springs are used to provide positive contact at the sealing surface when pressure loading across the seal is low.

However, this mounting arrangement for the leaf seals is relatively complex and subject to damage during the assembly process in view of the relatively close quarters in this region. The leaf seals and springs are relatively small components, and the mounting tabs are therefore positioned relatively close to the aft rail which increases the difficulty of assembling and securing these components. The headed pins are located in holes drilled through mounting tabs and blind holes part way through the rail or flange. The aft rail and the tabs must be accurately machined to close tolerances, and the limited access provided due to their closeness increases the difficulty and cost of manufacturing the blind holes that extend part way through the rail or flange in an aftwardly direction. Following assembly, the mounting pin heads are tack welded to the tabs. Tack welding is complicated due to lack of space and the proximity of the thin sheet metal leaf seals and springs which are often damaged by inadvertent contact with the welding apparatus.

Manufacturing of the blind holes in the rail or flange is time consuming and expensive as each hole is required to be drilled through the tab but may not break through the aft nozzle flange due to leakage concerns (The pressure differential across this flange is very high). The current production process uses unique hook shaped EDM electrodes to generate these blind hole features. During nozzle segment repair, the mounting pins, springs and seals must be removed to facilitate removal and reapplication of the nozzle environmental coatings. Pin removal involves hand grinding of the tack welds which destroys the mounting pin head and can damage the cast tab. In addition, the blind holes must then be redrilled (EDM) to remove any coating build up due to the repair process.

A leaf seal mounting system is desirable for simplifying the manufacture and assembly thereof and eliminating tack welding of the mounting pins and drilling of the blind hole into the aft rail or flange.

SUMMARY OF THE INVENTION

A gas turbine engine arcuate segment has an arcuate band segment, at least one tab and an arcuate rail segment spaced axially apart from the tab and located along an axial end of the band segment. The tab and the arcuate rail segment extend radially away from the band segment and a space is located between the tab and the rail segment. The tab has a tab aperture entirely therethrough and the rail segment has a rail aperture entirely therethrough. The exemplary embodiment of the invention includes forward and aft cylindrical aperture sections, respectively, connected by a conical aperture section therebetween in the tab aperture and the forward cylindrical aperture section having a first diameter D1 that is smaller than second diameters D2 of the aft cylindrical aperture section and the rail aperture. A more particular embodiment of the invention is a leaf seal assembly and further includes the arcuate segment having an arcuate band segment with the tab and the arcuate rail segment spaced axially apart from the tab and located along an axial end of the band segment. The tab and the arcuate rail segment extend radially away from the band segment. A leaf seal and a spring are disposed within the space between the tab and the rail segment to bias the leaf seal against the aft rail. The spring has a spring aperture entirely therethrough, the leaf seal has a seal aperture entirely therethrough, and a headless pin is disposed in the apertures such that the leaf seal and the spring are radially restrained by the pin. The exemplary embodiment of the invention includes an axial restraining means for preventing axial movement of the pin out of the tab aperture. One embodiment of the axial restraining means includes an interference fit between the pin and the tab within the tab aperture. The pin has a shank connected to an axially forwardly located conical tapering pin section. The interference fit includes the conical tapering pin section abutting against the conical tapering aperture section. A securing means for axially securing the pin within the rail aperture includes, in the exemplary embodiment, a press fit of the pin in the rail aperture.

Another more particular embodiment of the invention is a gas turbine engine turbine nozzle segment having at least two circumferentially adjacent vanes that are joined together such as by brazing. Each vane has one or more hollow stator airfoils extending radially between radially inner and outer arcuate band panels, respectively. Circumferentially adjacent ones of the inner and outer band panels have corresponding inner and outer arcuate band segments of the nozzle segments. The aft rail segments are located at aft panel ends of the outer band panels, the tabs extend radially away from the outer arcuate band panels forming the spaces between the tabs and the aft rail segments. At least one of the tabs are on each of the outer arcuate band panels and the arcuate leaf seal is disposed within the spaces. The spring is disposed within each of the spaces between each of the tabs and the aft rail segments and the springs and leaf seal are operable to bias the leaf seal against the aft rail segments.

Yet another more particular embodiment of the invention is a gas turbine engine assembly having a first arcuate segment defining a flowpath of combustion gases and having an outwardly extending rail at one end thereof. A second arcuate segment is disposed coaxially with the first arcuate segment for defining a continuation of the flowpath and has a radially extending face adjoining the rail. The arcuate leaf seal bridges the rail and the face for sealing leakage therebetween of air outboard of the first segment. One embodiment of the gas turbine engine turbine assembly includes the arcuate gas turbine engine turbine nozzle segment axially adjacent to and forward of an arcuate shroud assembly portion. The portion includes circumferentially adjoining arcuate turbine shroud segment supported from a circumferentially adjoining shroud hanger. The shroud segment or the shroud hanger has a radially extending face. The arcuate leaf seal disposed within the spaces of the gas turbine engine turbine nozzle segment bridges the rail segment and the face for sealing leakage therebetween of air outboard of the nozzle segment.

The present invention simplifies and reduces the cost of manufacturing of the holes in the rail or flange by no longer using blind holes that are drilled through the tab but may not allowed to break through the rail or flange. The present invention eliminates the blind holes while still reducing or eliminating leakage through the holes. The invention also simplifies and reduces the cost of nozzle segment repair because it facilitates removal and reapplication of the nozzle environmental coatings. The invention also eliminates pin removal by hand grinding of the tack welds which destroys the mounting pin head and can damage the cast tab. The present invention provides a leaf seal mounting system that simplifies the manufacture and assembly thereof and eliminates tack welding of the mounting pins and drilling of the blind hole into the aft rail or flange.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
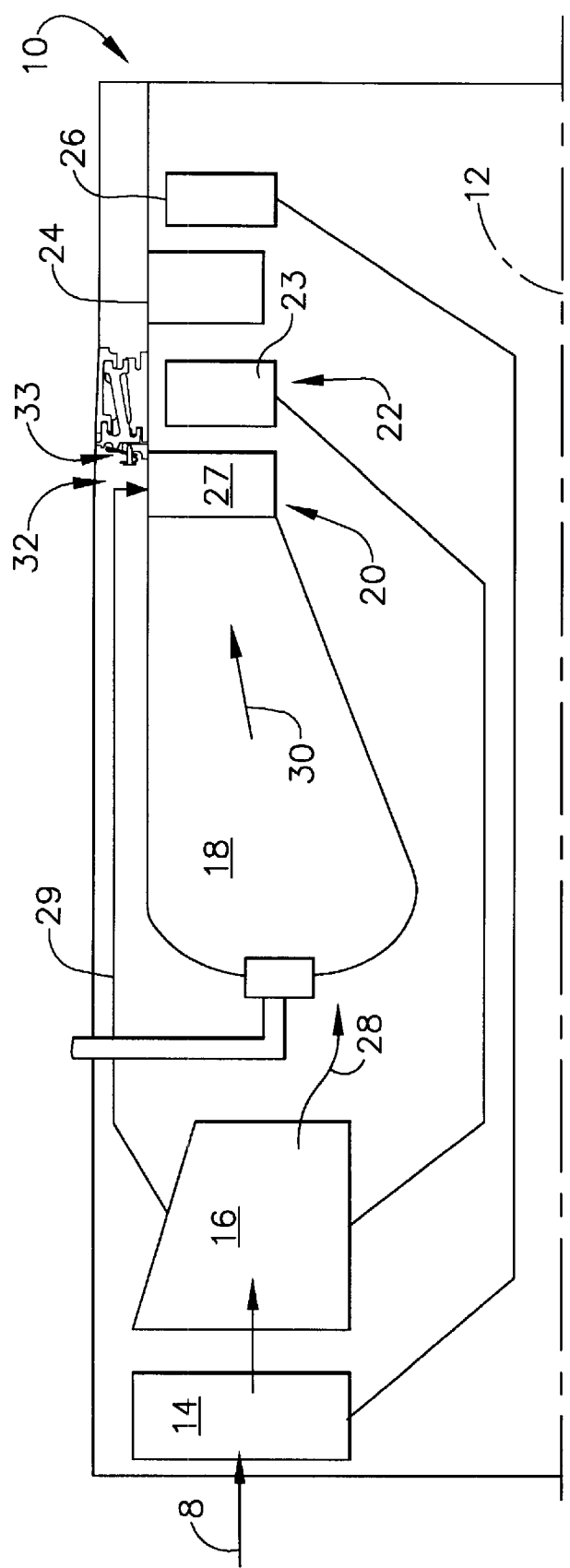
FIG. 1 is a schematic illustration of an exemplary aircraft turbofan gas turbine engine including a turbine nozzle and an exemplary embodiment of a leaf seal mounting assembly of the present invention.

Illustrated schematically in FIG. 1 is a portion of an exemplary aircraft turbofan gas turbine engine 10 which is axisymmetrical about a longitudinal or axial centerline axis 12. The engine 10 includes in serial flow communication a fan 14, multistage axial compressor 16, annular combustor 18, high pressure turbine nozzle 20, a single stage high pressure turbine rotor 22, and one or more stages of low pressure turbine nozzles 24 and rotors 26. The high pressure rotor 22 is joined to the compressor 16 by a first shaft and a low pressure rotor 26 is joined to the fan 14 by a second coaxial shaft. During operation, ambient air 8 flows downstream through the fan 14, the compressor 16 from where it exits as compressed air 28 and is then flowed into the combustor 18. The compressed air 28 is mixed with fuel and ignited in the combustor 18 generating hot combustion gases 30 which flow downstream through turbine stages which extract energy therefrom for powering both the fan 14 and the compressor 16. The various stator and rotor components of the turbines downstream from the combustor 18 define a flowpath 27 which channels the hot combustion gases therethrough for discharge from the engine. Downstream of and adjacent to the high pressure turbine nozzle 20 is the high pressure turbine rotor 22. The rotor 22 may take any conventional form having a plurality of circumferentially spaced apart rotor blades 23 extending radially outwardly from a rotor disk for extracting energy from the gases 30 and powering the compressor 16.

A portion of the compressed air 28 is bled from the compressor 16 to provide bleed air which can be used as cooling air 29 which is channeled to various parts of the turbines such as the high pressure nozzle 20 to provide cooling thereof. The cooling air 29 is channeled around and through the high pressure turbine nozzle 20 at a substantially higher pressure than that of the combustion gases 30 flowing therethrough during operation. Turbine components are often manufactured in arcuate segments and then assembled together in the engine 10 forming axially adjacent turbine components. Various joints or gaps are provided between annular assemblies of arcuate segments which must be suitably sealed for preventing leakage of the high pressure cooling air 29 into the combustion or exhaust flowpath 27. The use of bleed air for cooling turbine components decreases the overall efficiency of the engine 10 and its use is minimized. It is desirable to provide suitable seals between the stationary or stator turbine components for reducing to a minimum the amount of cooling air leakage into the exhaust flowpath for increasing efficiency of the engine.

Figure 2:
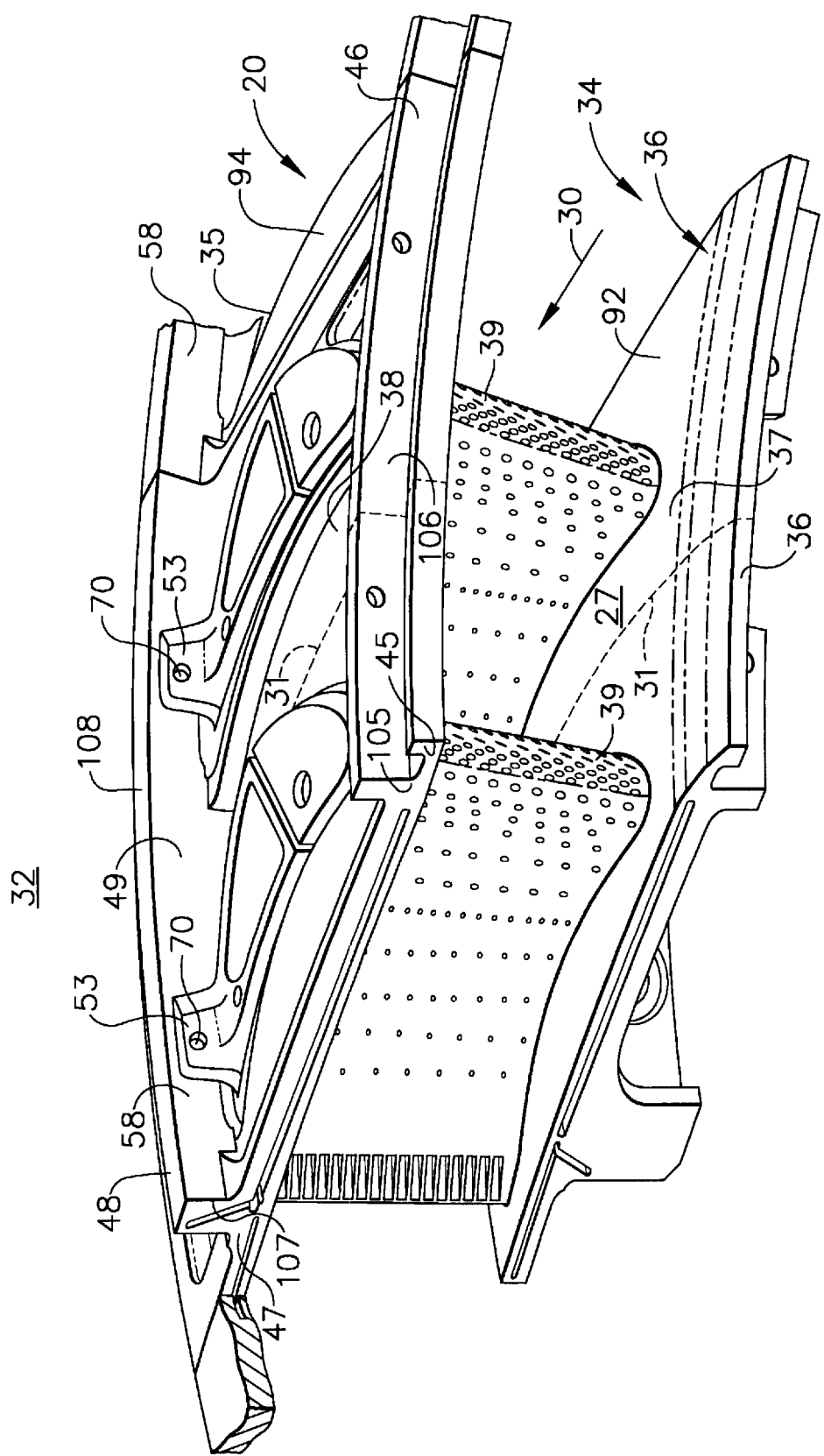
FIG. 2 is perspective view illustration of the exemplary turbine nozzle in the engine in FIG. 1.
Figure 3:
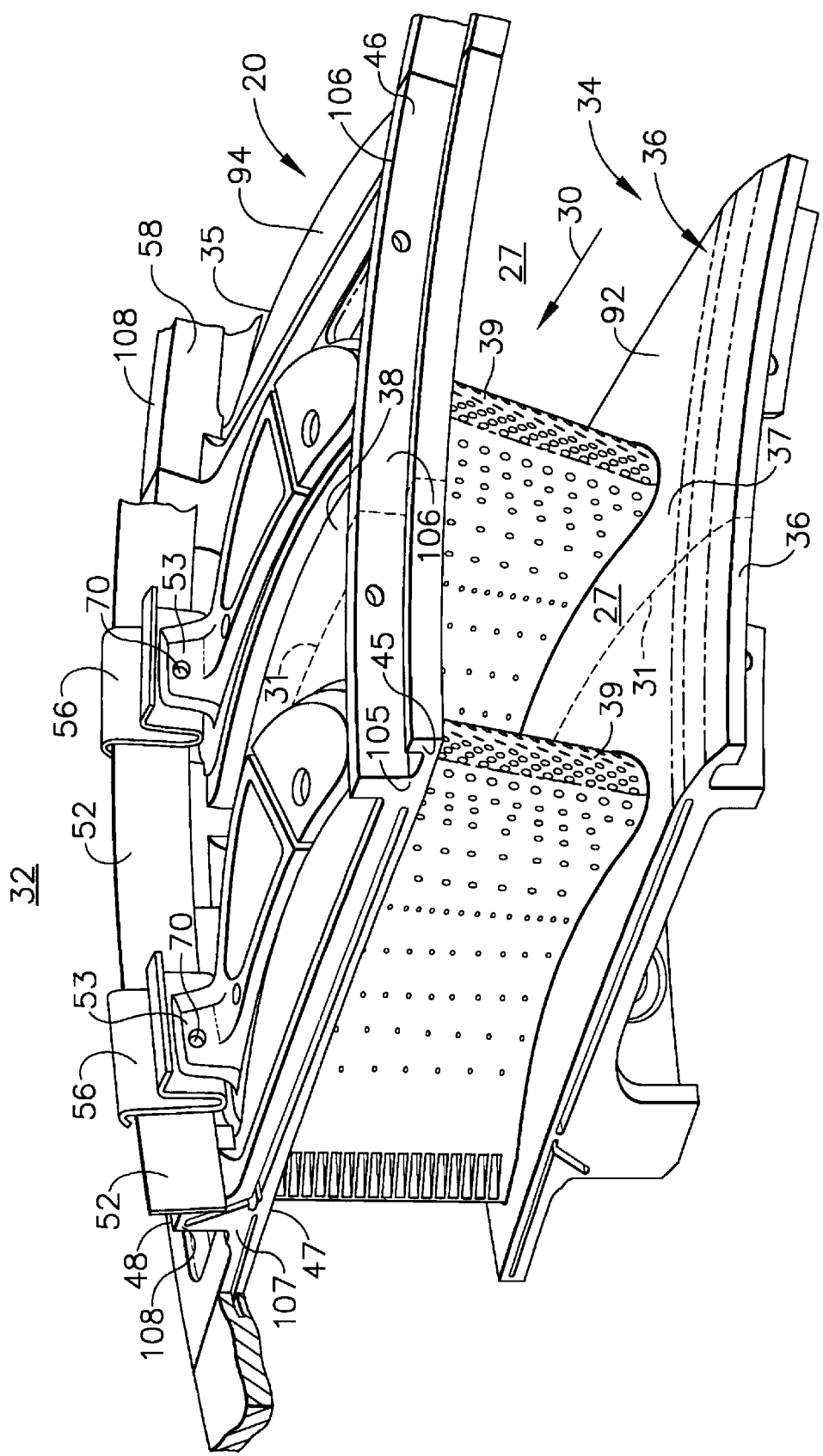
FIG. 3 is an enlarged portion of the perspective view illustration of the exemplary turbine nozzle in FIG. 2 with the leaf seal.

One example of a stationary or stator turbine arcuate component is a turbine nozzle segment 32 of the annular high pressure turbine nozzle 20 illustrated in FIGS. 2 and 3. Circumferentially adjoining nozzle segments 32 are bolted or otherwise joined together to form the full ring annular high pressure turbine nozzle 20. The turbine nozzle segment 32 is made from two or more vanes 34 that are circumferentially joined together such as by brazing illustrated by a braze line 31. The high pressure turbine nozzle 20 includes an annular segmented radially outer band 35, and a coaxial annular segmented radially inner band 36 between which extend radially and are fixedly joined thereto a plurality of circumferentially spaced apart hollow stator airfoils 39. Each vane 34 includes one of the hollow stator airfoils 39 extending radially between radially inner and outer band panels 92 and 94, respectively. Circumferentially adjacent ones of the inner and outer band panels 92 and 94 form corresponding inner and outer arcuate band segments 37 and 38 of the nozzle segments 32. Forward and aft rail segments 106 and 108, respectively, are located at corresponding forward and aft panel ends 105 and 107, respectively, of each of the inner and outer band panels 92 and 94. The radially inner and outer arcuate band segments 37 and 38 of the nozzle segments 32 form the radially outer and inner bands 35 and 36, respectively. The inner surface of the outer band 35 and the outer surface of the inner band 36 define portions of flowpath boundaries for the combustion gases 30 which are channeled downstream to the turbine rotor 22.

Figure 4:
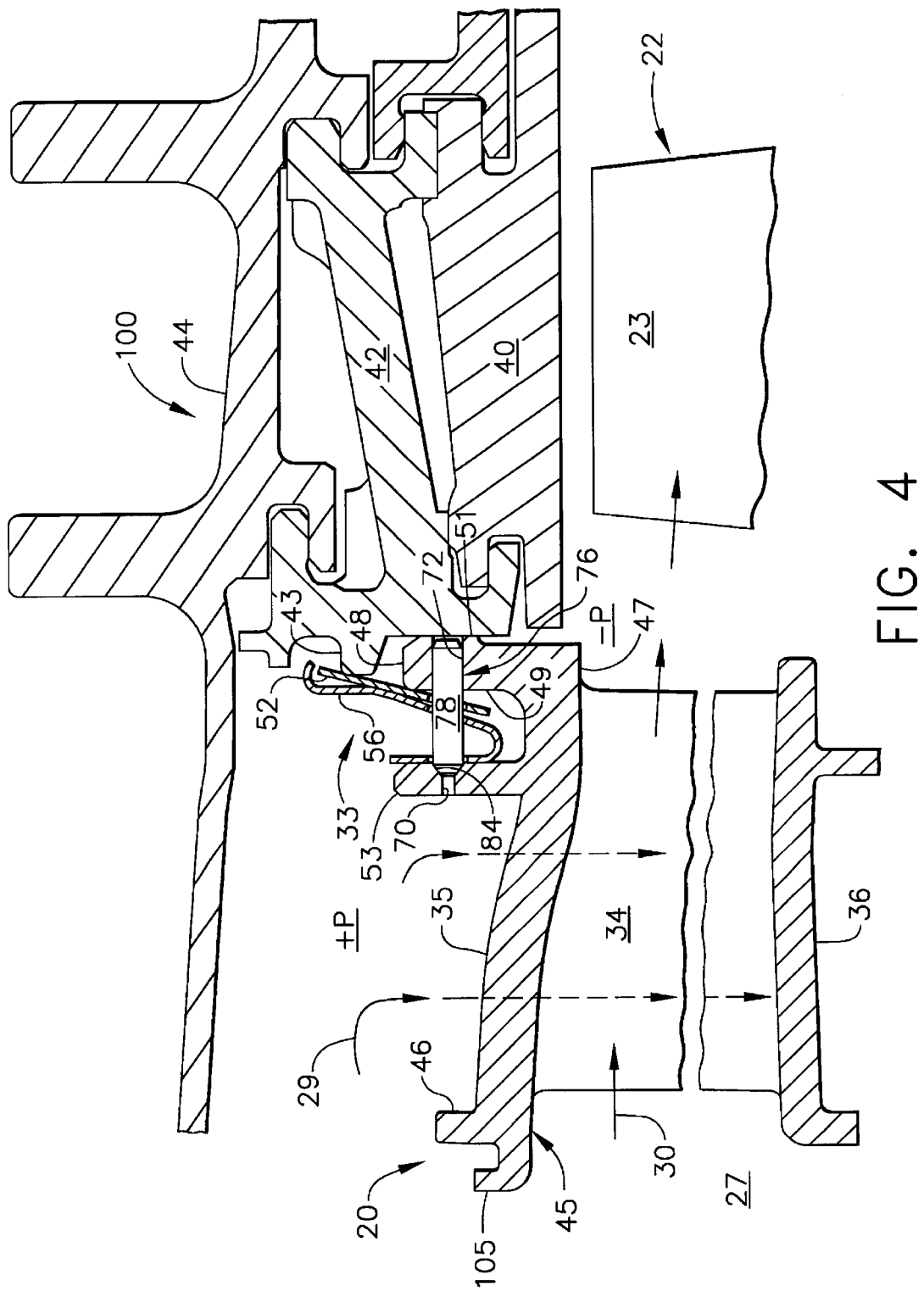
FIG. 4 is an enlarged partly sectional axial view illustration of the turbine nozzle and a rotor shroud illustrated in FIG. 1 with the leaf seal mounted therebetween.

Referring to FIG. 4, adjoining and axially downstream of the outer band 35 is a stationary shroud assembly 100 which bounds and confines flowpath 27 radially outwardly of the turbine blades 23. The shroud assembly 100 is made from a plurality of circumferentially adjoining arcuate turbine shroud segments 40 supported from a plurality of circumferentially adjoining shroud hangers 42, which in turn are supported from an annular outer casing 44 using forward and aft hooks and retention clips. The shroud segments 40 and hangers 42 are disposed coaxially with the turbine nozzle 20 for defining a radially outer flowpath boundary around the turbine blades 23 along which the combustion gases 30 flow from the nozzle 20. In alternate embodiments, the individual shroud segments 40 may be directly mounted to the outer casing 44, but in the exemplary embodiment illustrated in FIG. 4, the shroud segments 40 are mounted to the shroud hangers 42, which in turn are mounted to the casing 44.

The cooling air 29 is channeled around the nozzle 20 and flows radially inwardly through the individual airfoils 39 for cooling thereof and circulates around the outer surface of the outer band 35. The cooling air 29 is at a relatively high pressure +P compared to the lowered pressure −P of the combustion gases 30 channeled through the nozzle 20. Turbine leaf seal assemblies 33 are used for mounting a leaf seal 52 between the various turbine stator components to prevent or inhibit leakage of the cooling air 29 into the turbine flowpath 27. In the exemplary engine illustrated in FIG. 1, one embodiment of the turbine leaf seal assembly 33 is located between the high pressure turbine nozzle 20 and the high pressure turbine rotor 22, with it being understood that the leaf seal assembly 33 may be used and adapted for other analogous sealing applications within the engine 10 and, in particular, between the various turbine stator components thereof.

Figures 5, 6:
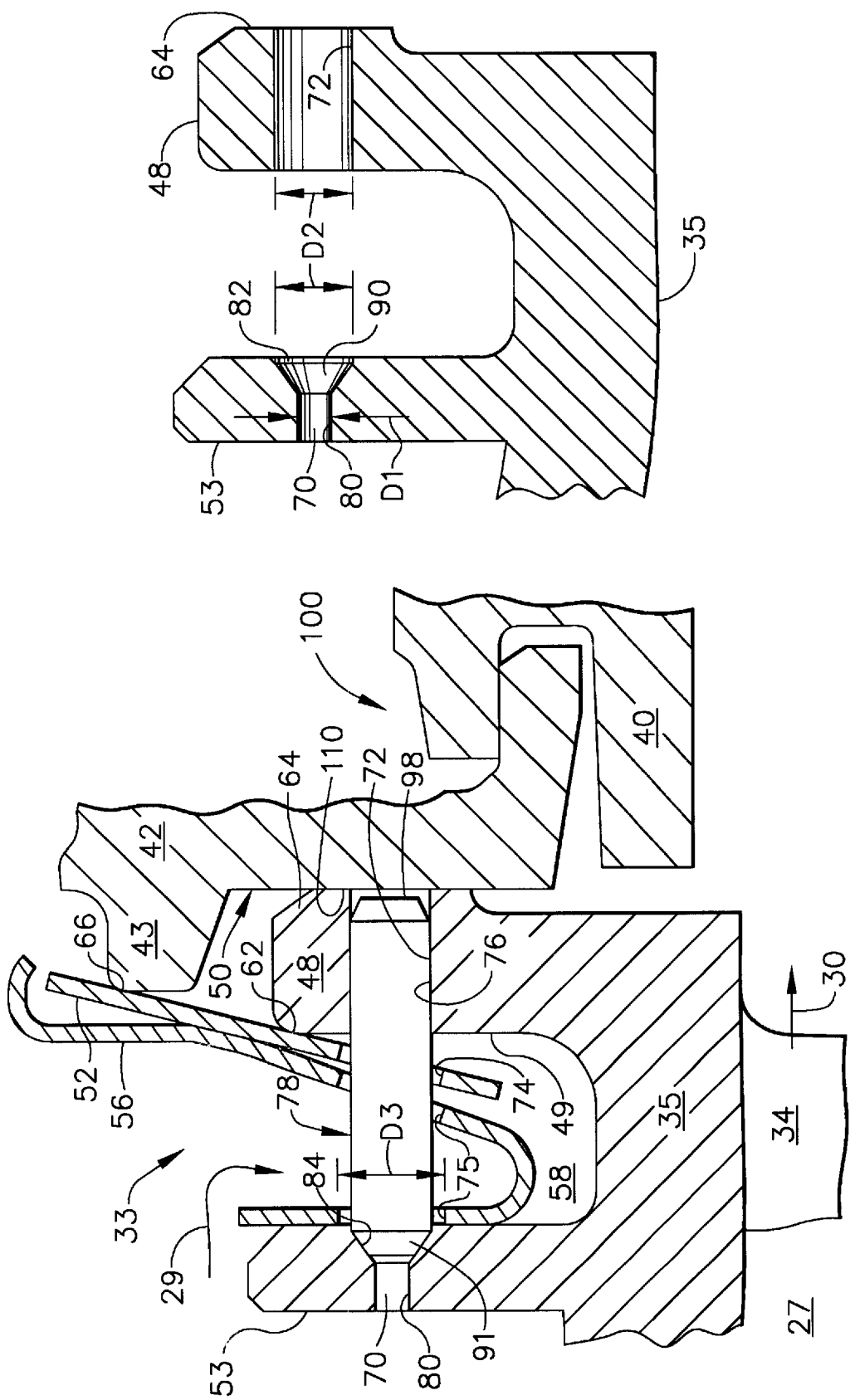
FIG. 5 is an enlarged sectional axial view illustration of the leaf seal mounting assembly illustrated in FIG. 4.
FIG. 6 is an enlarged axial sectional view of the aft rail segment and tab of the leaf seal mounting assembly illustrated in FIG. 5.

Referring back to FIGS. 2 and 3, the high pressure turbine nozzle 20 is assembled from the circumferentially adjoining nozzle segments 32 for reducing stress therein due to differential thermal expansion and contraction. The nozzle outer band 35 includes axially spaced apart forward and aft rails 46, 48 located at corresponding forward and aft ends 45, 47 respectively, of the outer band. Thus, in the exemplary embodiment of the invention illustrated herein, there are two tabs 53 and one leaf seal 52 for each aft rail 48. The forward and aft rails 46, 48 extend radially and circumferentially therewith in an integral, cast configuration. The leaf seal assembly 33 is configured for sealing between the aft rail 48 and either of the turbine shroud segment 40 or its corresponding shroud hanger 42 as illustrated. Referring to FIGS. 4 and 5, the shroud hanger 42 and the shroud segments 40 define an extension or continuation of the outer flowpath boundary of the outer band 35. The hanger 42 includes a radially extending forward face 50 directly axially facing and adjoining the aft rail 48. The leaf seal assembly 33 illustrated herein is specifically configured for sealing the adjoining nozzle outer band 35 and shroud hanger 42. The first and second arcuate segments defined by the outer band 35 and the shroud hanger 42 in this exemplary embodiment are sealed using an arcuate leaf seal 52 which bridges the aft rail 48 and the forward face 50 for sealing leakage therebetween of the cooling air 29 outboard of the outer band 35.

The leaf seal assembly 33 includes a plurality of circumferentially spaced apart and radially extending tabs 53 spaced axially aft from the aft rail 48 having axially extending spaces 58 between the tabs 53 and the aft rail 48. One of tabs 53 is mounted on each of the outer band panels 94 of the outer arcuate band segment 38 of the nozzle segments 32. The tabs 53 are typically formed integrally with the outer band 35. The leaf seal 52 and leaf springs 56 are disposed within each of the spaces 58 between the tabs 53 and the aft rail 48 to bias or pre-load the leaf seal 52 against the aft rail 48 and forward face 50 to effect sealing therebetween. Each of the tabs 53 has a tab aperture 70 entirely therethrough and the leaf spring has spring apertures 75 entirely therethrough. The aft rail 48 and the leaf seal 52 have rail and seal apertures 72 and 74, respectively, entirely therethrough. The apertures are designed and layed out such that each set of the tab and spring apertures 70 and 75 are axially alignable with one each of the rail and seal apertures 72 and 74. When assembled and so aligned, a mounting pin 78 can be placed through all corresponding apertures such that the leaf seal 52 and the leaf springs 56 are radially restrained by the mounting pin.

The apertures are illustrated as having round cross-sections but could have other shapes. The rail, seal, and spring apertures 72, 74, and 75, respectively, have the same cross-sectional circular shape. The tab aperture 70 has axially forward and aft cylindrical aperture sections 80 and 82. The aft cylindrical aperture section 82 has the same circular cross-sectional shape as the rail and seal apertures 72 and 74. The forward cylindrical aperture section 80 is more narrow and has a smaller cross-sectional first diameter D1 than cross-sectional second diameters D2 of the aft cylindrical aperture section 82 and the rail aperture 72. The spring and seal apertures 75 and 74 axially extend entirely through the spring 56 and the leaf seal 52, respectively, and have about the same size third diameters D3 that are larger than the second diameters D2 of the aft cylindrical aperture section 82 and the rail aperture 72. A conical tapering aperture section 90 transitions between the forward and aft cylindrical aperture sections 80 and 82.

The mounting pins 78 are disposed though the rail, seal, and spring apertures 72, 74, and 75 and extend through at least the aft cylindrical section 82 of the tab aperture 70. The mounting pin 78 is a headless pin designed to fit into the leaf seal assembly 33 through an aft opening of the rail aperture 72. The mounting pin 78 has a cylindrical shank 98 which passes through the rail, seal, and spring apertures 72, 74, and 75. The mounting pin 78 has an axially forwardly located conical tapering pin section 91 attached to the shank 98. The conical tapering pin section 91, and the shank 98 of the mounting pin 78 are designed to fit into the conical tapering aperture section 90, and the aft cylindrical aperture section 82, respectively.

The leaf seal assembly 33 includes a means for axially securing the mounting pins 78 within the rail apertures 72 during assembly. The exemplary embodiment of invention uses a tight press fit 76 of the mounting pins 78 into the rail apertures 72 which provides aftwardly axial retention of the mounting pin 78. Forward axial restraint is provided by an interference fit 84 exemplified by the conical tapering pin section 91 of the mounting pin 78 abutting against the conical tapering aperture section 90 of the tab aperture 70. There is but one type of axial restraining means available for preventing axial movement of the mounting pin out of the tab aperture 70. Other types of interference fits 84 between the mounting pin 78 and the tab 53 may be used with different shapes for the tab aperture 70. The tab aperture 70 is a counter-bored hole in the exemplary embodiment. Other techniques may be used to axially secure or retain the mounting pin 78 within the apertures listed above. The press fit 76 serves two functions, retention of the mounting pin 78 during engine assembly and sealing of the rail apertures 72 which would otherwise be an undesirable leakage path. The prior art techniques use welding, brazing, or other metallurgical bonding to bond a head of a pin to the tab or another part of the mounting pin to static structure.

The hole geometry is a counter-bored design that allows through drilling of the rail aperture 72 to be performed forwardly from an aft facing rail side 51 through on the aft rail 48 and provides a positive axial retention and fixed location to prevent the pin moving forward during engine operation. During the engine assembly, the pin is prevented from moving aft by the press fit 76 and during engine operation by a mating forward face 50 of the hanger 42. Repair is also simplified with the present invention because no welds are required and none have to be removed and the mounting pins can be driven out from the forward through the counter-bored hole in the tab. Hole clean-up after coating repair can be achieved using a standard reaming tool.

Illustrated in FIG. 4 is the assembled leaf seal assembly 33, the leaf seals 52 and leaf springs 56 may take any conventional form and are typically made of a suitable metal for the hot turbine environment. The leaf seals 52 being arcuate segments which circumferentially adjoin each other around the circumference of the nozzle 20. A pair of the mounting pins 78 are typically used for mounting the circumferentially opposite ends of the leaf seal 52 between and to two of the tabs 53 and the aft rail 48. Each leaf spring 56 is a generally partially folded member with a U-configuration for being trapped and placed in compression between the tab 53 and the leaf seal 52 for biasing the leaf seal 52 against the aft rail 48 and the forward face 50 of the shroud hanger 42. The leaf springs 56 are preferably slightly compressed when assembled to provide a suitable pre-load on the leaf seals 52. The leaf seal 52 and leaf spring 56 have suitably sized apertures for loosely surrounding the cylindrical shank 98 of the mounting pin 78.

Referring again to FIGS. 3 and 4, the aft rail 48 further includes a circumferentially extending first arcuate seat 62 at the radially outer outboard end thereof on a forward facing side 49 of the aft rail 48 for seating thereagainst an intermediate portion of the leaf seal 52 in line contact. An arcuate aft face pad 64 on the aft facing rail side 51 of the aft rail 48 is located axially oppositely the first arcuate seat 62. Correspondingly, the forward face 50 of the hanger 42 includes an outboard portion on an integral lip 43 which defines a second arcuate seat 66 which receives in axially abutting contact therewith an outboard portion of the leaf seal 52 for seating thereagainst in line contact around the circumference of the hanger 42. Accordingly, the leaf seal 52 frictionally engages and provides a secondary seal at the first and second seats 62, 66 to seal air leakage between the aft rail 48 and the hanger 42. An inboard portion of the hanger forward face 50 below the lip 43 defines a flat radially extending land 110 which receives in abutting contact therewith the aft face pad 64 to provide a primary friction seal thereat. The aft face pad 64 extends circumferentially for providing the primary seal around the circumference of the aft rail 48 and can accommodate differential radial movement between the aft rail 48 and the hanger 42. The aft face pad 64 and cooperating forward face 50 of the shroud hanger 42 provide primary sealing between these components, with the leaf seal 52 being mounted in an arrangement for providing a secondary seal between these components.

Although the leaf seal assembly 33 has been specifically described with respect to sealing the outboard aft end of the turbine nozzle 20 with the adjoining shroud segments 40 and shroud hanger 42, it may be suitably located and adapted for sealing between any adjacent stator components in the turbine section of the engine 10. Leaf seals are commonly found in turbines in high pressure and low pressure turbine sections between the stationary turbine nozzles and blade shrouds and hangers. The leaf seal assembly 33 may therefore be used to replace any similarly configured pin mounted using leaf seals.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine arcuate segment comprising:
   an arcuate band segment,
   at least one tab and an arcuate rail segment spaced axially apart from said tab and located along an axial end of said band segment,
   said tab and said arcuate rail segment extending radially away from said band segment,
   a space between said tab and said rail segment,
   said tab has a tab aperture entirely therethrough, and
   said rail segment has a rail aperture entirely therethrough.

2. An arcuate segment as claimed in claim 1, further comprising said tab aperture having forward and aft cylindrical aperture sections respectively connected by a conical aperture section therebetween and said forward cylindrical aperture section having a first diameter that is smaller than second diameters of said aft cylindrical aperture section and said rail aperture.

3. A leaf seal assembly comprising:
   an arcuate segment having an arcuate band segment,
   at least one tab and an arcuate rail segment spaced axially apart from said tab and located along an axial end of said band segment,
   said tab and said arcuate rail segment extending radially away from said band segment,
   a space between said tab and said rail segment,
   said tab having a tab aperture entirely therethrough,
   said rail segment having a rail aperture entirely therethrough,
   a leaf seal and a spring operably disposed within said space between said tab and said rail segment to bias said leaf seal against said rail segment,
   said spring having a spring aperture entirely therethrough and said leaf seal having a seal aperture entirely therethrough, and
   a headless pin disposed in said apertures such that said leaf seal and said spring are radially restrained by said pin.

4. An assembly as claimed in claim 3, further comprising an axial restraining means for preventing axial movement of said pin out of said tab aperture.

5. An assembly as claimed in claim 4, wherein said axial restraining means includes an interference fit between said pin and said tab within said tab aperture.

6. An assembly as claimed in claim 5, further comprising:
   said tab aperture having forward and aft cylindrical aperture sections respectively connected by a conical aperture section therebetween,
   said pin having a shank connected to an axially forwardly located conical tapering pin section, and
   said interference fit comprising said conical tapering pin section abutting against said conical tapering aperture section.

7. An assembly as claimed in claim 3, further comprising a securing means for axially securing said pin within said rail aperture.

8. An assembly as claimed in claim 7, wherein said securing means includes a press fit of said pin in said rail aperture.

9. An assembly as claimed in claim 7, further comprising an axial restraining means for preventing axial movement of said pin out of said tab aperture.

10. An assembly as claimed in claim 9, wherein said axial restraining means includes an interference fit between said pin and said tab within said tab aperture.

11. An assembly as claimed in claim 10, further comprising:
    said tab aperture having forward and aft cylindrical aperture sections respectively connected by a conical aperture section therebetween,
    said pin having a shank connected to an axially forwardly located conical tapering pin section, and
    said interference fit comprising said conical tapering pin section abutting against said conical tapering aperture section.

12. A gas turbine engine arcuate turbine nozzle segment comprising:
    at least two circumferentially adjacent vanes that are joined together,
    each vane having one or more hollow stator airfoils extending radially between radially inner and outer arcuate band panels, respectively,
    circumferentially adjacent ones of said inner and outer band panels comprising corresponding inner and outer arcuate band segments of said nozzle segments,
    aft rail segments located at aft panel ends of said outer band panels,
    tabs extending radially away from said outer arcuate band panels forming spaces between said tabs and said aft rail segments,
    at least one of said tabs on each of said outer arcuate band panels,
    an arcuate leaf seal disposed within said spaces and a spring disposed within each of said spaces between each of said tabs and said aft rail segments,
    said springs and leaf seal operably disposed to bias said leaf seal against said aft rail segments,
    each of said tabs having a tab aperture entirely therethrough, said spring having a spring aperture entirely therethrough, said leaf seal having seal apertures entirely therethrough, and said aft rail segments having at least one rail aperture entirely therethrough, and
    a headless pin disposed within each set of axially aligned ones of said apertures such that said leaf seal and said springs are radially restrained by said pins.

13. A turbine nozzle segment as claimed in claim 12, further comprising an axial restraining means for preventing axial movement of said pins out of said tab apertures.

14. A turbine nozzle segment as claimed in claim 13, wherein said axial restraining means includes an interference fit between said pins and said tabs within said tab apertures.

15. A turbine nozzle segment as claimed in claim 14, further comprising:
    each of said tab apertures having forward and aft cylindrical aperture sections respectively connected by a conical aperture section therebetween,
    each of said pins having a shank connected to an axially forwardly located conical tapering pin section, and
    said interference fit comprising said conical tapering pin section abutting against said conical tapering aperture section.

16. A turbine nozzle segment as claimed in claim 12, further comprising a securing means for axially securing said pins within said rail apertures.

17. A turbine nozzle segment as claimed in claim 16, wherein said securing means includes a press fit of said pins in said rail apertures.

18. A turbine nozzle segment as claimed in claim 17, further comprising an axial restraining means for preventing axial movement of said pins out of said tab apertures.

19. A turbine nozzle segment as claimed in claim 18, wherein said axial restraining means includes an interference fit between said pin and said tab within said tab aperture.

20. A turbine nozzle segment as claimed in claim 19, further comprising:
   each of said tab apertures having forward and aft cylindrical aperture sections respectively connected by a conical aperture section therebetween,
   each of said pins having a shank connected to an axially forwardly located conical tapering pin section, and
   said interference fit comprising said conical tapering pin section abutting against said conical tapering aperture section.

21. A gas turbine engine assembly comprising:
   a first arcuate segment defining a flowpath of combustion gases and having a radially outwardly extending rail at one end thereof,
   a second arcuate segment disposed coaxially with said first segment for defining a continuation of said flowpath and having a radially extending face adjoining said rail,
   an arcuate leaf seal bridging said rail and said face for sealing leakage therebetween of air outboard of said first segment,
   a plurality of headless mounting pins extending through said leaf seal,
   tabs extending radially outwardly from said first arcuate segment and spaced axially apart from said rail,
   spaces between said tabs and said rail,
   springs and said leaf seal disposed within said spaces between said tabs and said rail,
   said tabs have tab apertures entirely therethrough, said springs have spring apertures entirely therethrough, said leaf seal has seal apertures entirely therethrough, and said rail has rail apertures entirely therethrough, and
   said headless mounting pins disposed in said apertures such that said leaf seal and said springs are radially restrained by said pins.

22. An assembly as claimed in claim 21, further comprising axial restraining means for preventing axial movement of said pins out of said tab apertures.

23. An assembly as claimed in claim 22, wherein said axial restraining means includes an interference fit between each of said pins and said tabs within said tab apertures.

24. An assembly as claimed in claim 23, further comprising:
   each of said tab apertures having forward and aft cylindrical aperture sections respectively connected by a conical aperture section therebetween,
   each of said pins having a shank connected to an axially forwardly located conical tapering pin section, and
   said interference fit comprising said conical tapering pin section abutting against said conical tapering aperture section.

25. An assembly as claimed in claim 21, further comprising securing means for axially securing said pins within said rail apertures.

26. An assembly as claimed in claim 25, wherein said securing means includes a press fit of each of said pins in each of said rail apertures.

27. An assembly as claimed in claim 26, further comprising axial restraining means for preventing axial movement of said pins out of said tab apertures.

28. An assembly as claimed in claim 23, wherein said axial restraining means includes an interference fit between each of said pins and said tabs within said tab apertures.

29. An assembly as claimed in claim 28, further comprising:
   each of said tab apertures having forward and aft cylindrical aperture sections respectively connected by a conical aperture section therebetween,
   each of said pins having a shank connected to an axially forwardly located conical tapering pin section, and
   said interference fit comprising said conical tapering pin section abutting against said conical tapering aperture section.

30. A gas turbine engine turbine assembly comprising:
   a gas turbine engine arcuate turbine nozzle segment axially adjacent to and forward of an arcuate shroud assembly portion,
   said portion including circumferentially adjoining arcuate turbine shroud segments supported from a circumferentially adjoining shroud hanger,
   one of said shroud segments and said shroud hanger having a radially extending face,
   said nozzle segment comprising;
      at least two circumferentially adjacent vanes that are joined together,
      each vane having one or more hollow stator airfoils extending radially between radially inner and outer arcuate band panels, respectively,
      circumferentially adjacent ones of said inner and outer band panels further comprising corresponding inner and outer arcuate band segments of said nozzle segments,
      aft rail segments located at aft panel ends of said outer band panels,
      said aft rail segments adjoining said face,
      tabs extending radially away from said outer arcuate band panels forming spaces between said tabs and said aft rail segments,
      at least one of said tabs on each of said outer arcuate band panels,
      an arcuate leaf seal disposed within said spaces of the gas turbine engine turbine nozzle segment and bridging said rail segment and said face for sealing leakage therebetween of air outboard of said nozzle segment;
      a plurality of springs, each of said springs disposed within each of said spaces between each of said tabs and said aft rail segments,
      said springs and leaf seal operably disposed to bias said leaf seal against said aft rail segments,
      each of said tabs having a tab aperture entirely therethrough, each of said springs having a spring aperture entirely therethrough, said leaf seal having seal apertures entirely therethrough, and said aft rail segments having at least one rail aperture entirely therethrough, and
      a plurality of headless pins, each of said headless pins disposed within each set of axially aligned ones of said apertures such that said leaf seal and said springs are radially restrained by said pins.

31. A turbine nozzle segment as claimed in claim 30, further comprising axial restraining means for preventing axial movement of said pins out of said tab apertures.

32. A turbine nozzle segment as claimed in claim 31, wherein said axial restraining means includes interference fits between said pins and said tabs within said tab apertures.

33. A turbine nozzle segment as claimed in claim 32, further comprising:
- each of said tab apertures having forward and aft cylindrical aperture sections respectively connected by a conical aperture section therebetween,
- each of said pins having a shank connected to an axially forwardly located conical tapering pin section, and
- each of said interference fits comprising said conical tapering pin section abutting against said conical tapering aperture section.

34. A turbine nozzle segment as claimed in claim 33, further comprising securing means for axially securing said pins within said rail apertures.

35. A turbine nozzle segment as claimed in claim 34, wherein said securing means includes a press fit of said pins in said rail apertures.

* * * * *